United States Patent [19]

Cusack

[11] Patent Number: 4,542,590
[45] Date of Patent: Sep. 24, 1985

[54] TWO AXIS TOUCH PROBE

[75] Inventor: Robert F. Cusack, Grosse Pointe, Mich.

[73] Assignee: GTE Valeron Corporation, Troy, Mich.

[21] Appl. No.: 593,506

[22] Filed: Mar. 26, 1984

[51] Int. Cl.[4] ................................................ G01B 7/28
[52] U.S. Cl. ............................. 33/169 R; 33/172 E; 33/561
[58] Field of Search ............ 33/169 R, 172 E, 174 L, 33/149 J, 172 D, 148 H

[56] References Cited

U.S. PATENT DOCUMENTS

| | | | |
|---|---|---|---|
| 3,122,970 | 3/1964 | Rhodes | 33/174 L |
| 3,766,653 | 10/1973 | McKay, Sr. | 33/174 L |
| 4,136,458 | 1/1979 | Bell et al. | 33/148 H |
| 4,360,973 | 11/1982 | McMurtry | 33/174 L |
| 4,397,093 | 8/1983 | McMurtry | 33/174 L |
| 4,451,987 | 6/1984 | Cusack | 33/174 L |

Primary Examiner—Willis Little
Attorney, Agent, or Firm—Harness, Dickey & Pierce

[57] ABSTRACT

A touch probe is disclosed having a stylus holder mounting arrangement utilizing the combined effects of a planar reed spring and at least one linear wire spring to restrict permissible movement of the stylus holder relative to the probe housing to two axes.

20 Claims, 3 Drawing Figures

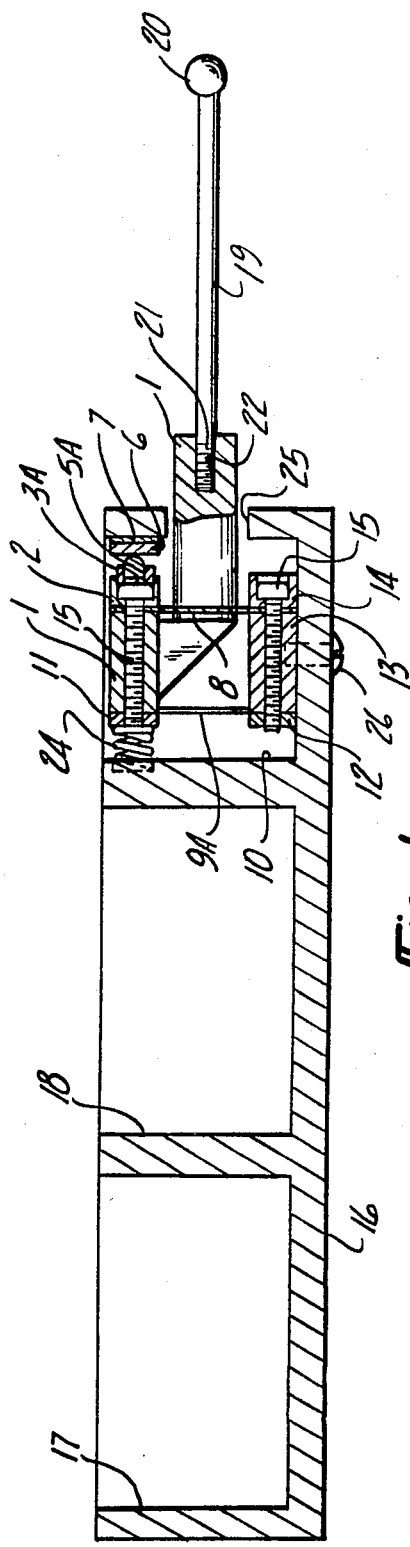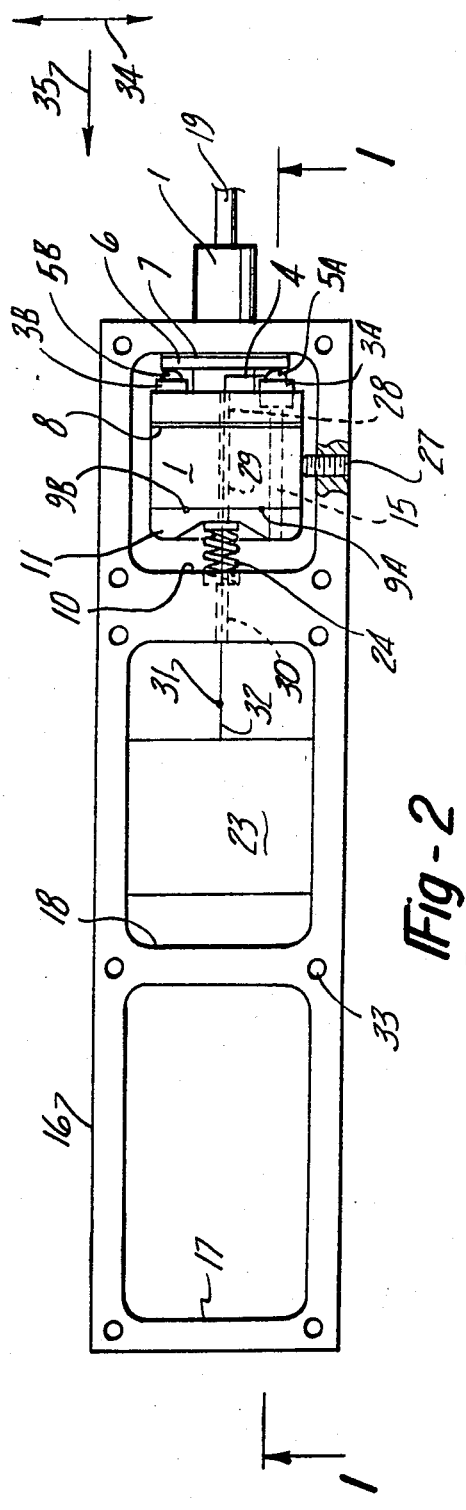

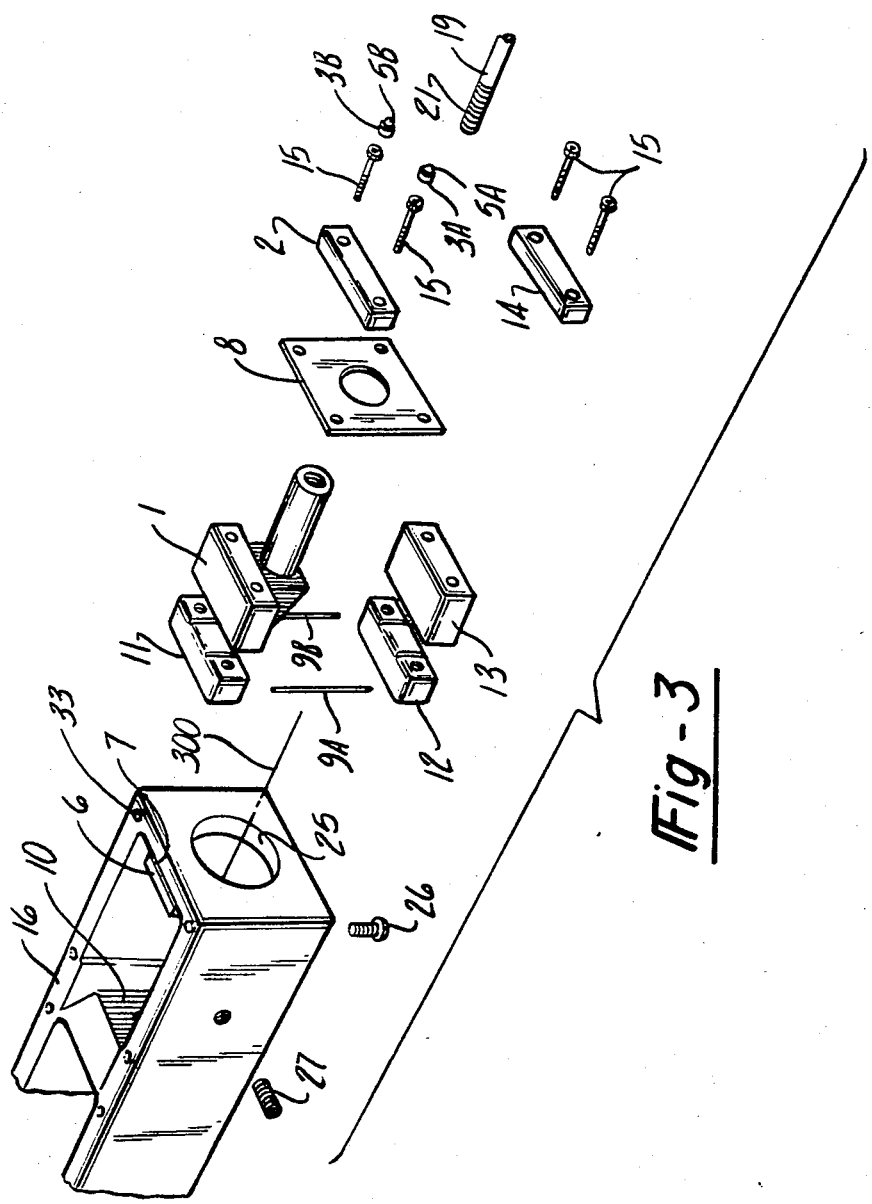

TWO AXIS TOUCH PROBE

BACKGROUND OF THE INVENTION

1. Field of the Invention

The invention relates generally to touch probes for use in gaging applications where an indication of contact between the probe and a workpiece is desired. More specifically, the invention concerns touch probes limited to use environments requiring only two axes of movement between the touch probe and the workpiece.

2. Description of the Prior Art

Automatic gaging of workpieces undergoing machining by numerically controlled machine tool systems during the work cycle—i.e. "in-cycle" gaging, is effected through the use of touch probes. Such probes are moved under control of a machine tool system program into contact with pre-selected portions of the workpiece at which time the touch probe signals the machine controller to calculate information related to the shape or location of the workpiece surface.

Known examples of touch probe designs are disclosed in U.S. patent application Ser. No. 388,187, now U.S. Pat. No. 4,451,987 filed June 14, 1982 by Robert F. Cusack, entitled "Touch Probe", and in U.S. patent application Ser. No. 501,994, filed June 14, 1983 by Richard O. Junegel, entitled "Turning Tool Probe", both applications assigned to the same assignee as the instant invention. The probes of both these prior patent applications have a stylus carrying element movable relative to a probe housing in three coordinate mutually perpendicular axes. Such three axes probes require electrical interconnection between the electrical contacts used therewith to properly indicate sensed contact by the stylus with a workpiece in any of the three axes. Such required contact interconnection in turn complicates the construction and attendant cost of manufacture of such three dimensional probes.

SUMMARY OF THE INVENTION

I have discovered a novel construction for touch probe stylus mounting apparatus wherein the stylus movement is limited to movement in two axes. Such probes find particular utility in automated in-cycle gaging applications on two axis machine tool systems such as numerically controlled turning centers or lathes.

In accordance with the principles of the invention, a first member is movable relative to a touch probe housing and is capable of being coupled to the probe stylus. A second member is fixed relative to the housing. A contact strip mounted to one of the first and second members confronts first and second contact elements mounted to the other one of the first and second members, and the first and second contact elements make a point contact with the contact strip in a rest position of the first member to define a linear dimension extending along a direction normal to an axis common to the probe housing and the stylus. The first and second members are mechanically coupled by a structure which prevents all motion of the first member relative to the second member except for linear motion parallel to the stylus/housing common axis and pivotal motion in planes parallel to both the common axis and the linear dimension defined by the rest position contact by the first and second contact elements with the contact strip.

The touch probe of this invention features improved rigidity, compactness and ease of manufacture when compared to known three axis, or three dimensional, probes.

BRIEF DESCRIPTION OF THE DRAWING

The objects and features of the invention will become apparent from a reading of a detailed description of an illustrative embodiment, taken in conjunction with the drawing in which:

FIG. 1 is a cross sectional view taken normal to the longitudinal axis shared by the housing and the stylus of a touch probe arranged in accordance with the principles of the invention;

FIG. 2 is a top plan view of the touch probe of FIG. 1; and

FIG. 3 is an exploded perspective view of the stylus mounting apparatus of the touch probe of FIGS. 1 and 2.

DETAILED DESCRIPTION

It is to be noted that the same components or parts thereof are designated with the same reference numerals in the various drawing figures.

With reference to FIGS. 1–3, a touch probe arranged in accordance with the principles of the invention has substantially rectangular elongate probe housing 16 divided internally into three cavities or compartments 10, 18 and 17. Cavity 10 houses the probe detector switch and stylus mounting apparatus. Cavity 18 houses the probe detector and telemetry circuitry 23, while cavity 17 holds the probe batteries for supplying operating power to the circuitry in housing cavity 18. A suitably shaped cover plate (not shown) seals cavity 17, 18 and 10 via screws engaging mounting holes 33 in housing 16.

Circuitry 23 accepts a signal from the sensor mechanism to be described below on input 32 and converts the signal for appropriate transmission via radiated telemetry to a remote receiver associated with the machine tool system utilizing the touch probe. The details of such circuitry 23 are not necessary to an understanding of this invention and are therefore not set forth in detail in this description. Examples of known arrangments suitable for use as circuitry 23 are set forth in U.S. Pat. No. 4,401,945—Juengel, issued Aug. 30, 1983, pending U.S. patent application Ser. No. 478,906—Juengel, filed Mar. 25, 1983, pending U.S. patent application Ser. No. 501,994—Manns, et al., filed June 14, 1983, and pending U.S. patent application Ser. No. 504,137—Juengel, filed June 14, 1983, all assigned to the same assignee as the instant invention.

The probe stylus movement sensing apparatus is contained in housing cavity 10. Mounting base or support block 13 is rigidly coupled to housing 16 via bolt 26 at a first side of cavity 10 extending normally to an end wall of the housing. A planar reed spring 8, which is resiliently deformable except in its major plane, has a first side coupled to support block 13 via reed clamp 14 and two screws 15. At an opposite end of support block 13 are first and second wire springs 9A and 9B each having one end coupled to support block 13 via wire spring clamp 12 which is also coupled to block 13 via the same two screws 15. Wire springs 9A and 9B are resiliently flexible except along their longitudinal axes.

Attached to the opposite ends of reed spring 8 and wire springs 9A, 9B is a stylus holder 1, which is movable relative to probe housing 16. Reed spring 8 is coupled to stylus holder 1 via reed spring clamp 2 and two additional screws 15. Wire springs 9A, 9B are coupled to stylus holder 1 via wire spring clamp 11 engaging the ends of the other two screws 15. A second portion of stylus holder 1 protrudes through a central aperture in reed spring 8 and in aperture 25 in the end wall of probe housing 16. The protruding portion of stylus holder 1 has a threaded bore 22 for coupling receipt of a threaded end 21 of replaceable stylus 19 having a suitably shaped contact tip portion 20.

Rigidly coupled to the end wall of housing 16 adjacent aperture 25 is a contact strip 6, preferably fashioned from cemented tungsten carbide. Contact strip 6 is electrically isolated from housing strip 16 by an adhesive non-conductive bonding strip 7. Contact strip 6 is positioned such that it extends along a dimension perpendicular or normal, to the common longitudinal axis 300 shared by housing 16, apperture 25 and the protruding portion of stylus holder 1. Mounted to the first portion of stylus holder 1 are substantially spherically shaped contacts 5A and 5B held respectively in contact holders, or cups, 3A and 3B. Contacts 5A and 5B are preferably fashioned from cemented tungsten carbide. In a rest position of stylus holder 1, contacts 5A and 5B abut contact strip 6 in point contact fashion, thereby defining a linear dimension passing through the two point contacts which is normal to axis 300, parallel to the non-deformable plane of reed spring 8, and normal to the longitudinal axis of wire springs 9A and 9B.

With the structure as set forth above, the combination of the reed spring 8 and wire springs 9A and 9B operates to restrict the movement of stylus holder 1 (and therefore movement of stylus 19) to either linear movement parallel to axis 300 (as shown by direction 35 in FIG. 2) or pivotal movement in planes parallel to both axis 300 and to the linear dimension defined by the point contacts between contacts 5A, 5B and contact strip 6 (i.e. the stylus tip can pivot generally in the direction 34 shown in FIG. 2). This two axis limitation arises, because reed spring 8 prevents rotation of stylus holder 1 about axis 300 and further prevents translational movement of holder 1 in directions normal to axis 300, while wire springs 9A, 9B being non-deformable along their longitudinal axes, permit pivoting movement of holder 1 only in planes parallel to both the linear dimension defined along contact strip 6 and to axis 300. It is to be noted that a single wire spring or flexible rod-like element is sufficient to cooperate with reed spring 8 to so constrain movement of stylus holder 1. However, two wire springs, as shown in the drawing figures, are preferred, due to the improved rigidity and resistance to probe damage achieved through use thereof.

To optionally assist in positively defining the rest postion contact between contacts 5A, 5B and contact strip 6, a biasing coil spring 24 may be interposed between a rearward housing wall of cavity 10 and the first portion of stylus holder 1. Alternatively, bias spring 24 could be replaced by the resilient action of a metal bellows (not shown) which would be coupled between the protruding portion of stylus holder 1 and the perimeter of housing aperture 25.

A further adjustment feature is provided by screw 27 threadingly engaging a bore in housing 16 running normal to axis 300 and placed so that an inner end of screw 27 engages stylus holder 1. As screw 27 is advanced toward stylus holder 1, holder 1 will pivot in the allowed plane of pivotal motion to differentially alter the pre-load force between contacts 5A, 5B and contact strip 6 in the stylus holder rest position. Hence, the pre-travel required to leave the rest position by stylus movement can be adjusted to compensate for a stylus that is slightly off center—i.e. having a longitudinal axis not in alignment with axis 300.

An electrical signal indicative of stylus movement from the probe rest position can be generated with the following arrangement. Contact 5B is grounded to housing 16 via electrically conductive mounting cup 3B, spring clamp 2, reed spring 8, and mounting base 13. Contact 5A is electrically isolated from grounded housing 16 via insulated contact mounting cup 3A and is coupled to output terminal 31 via conductor 4 which passes through conduit 28 in reed clamp 2, conduit 29 in stylus holder 1 and conduit 30 in the rear housing wall of cavity 10. Hence a simple series circuit in the probe rest position extends from electrical ground through contact 5B, through contact strip 6 (which, as previously mentioned, is electrically isolated from housing 16 by strip 7), through contact 5A to output terminal 31 via conductor 4. Thus, whenever one or both of contacts 5A and 5B begin to move, due to allowable stylus movement caused by contact with a workpiece, the electrical resistance between housing ground and output 31 will increase, thereby providing an electrical indicating signal to circuitry 23. This relatively simple arrangement is easy to manufacture, compact and rugged. Especially contributing to the ease of manufacture is the fact that no isolated electrical interconnection between contacts 5A and 5B is required.

It should be noted that the invention described herein has been illustrated with reference to a particular embodiment. It is to be understood that many details used to facilitate the description of such a particular embodiment are shown for convenience only and without limitations to the scope of the invention. Many other embodiments may be devised by those skilled in the art, given the instant disclosure. For example, the spherical contacts could be mounted to the housing, with the contact confronting them mounted to the movable stylus holder. By way of further example, the axial location of the reed spring and the wire springs could be reversed. Additionally, the exterior shape of the probe housing may take whatever form necessary to adapt the probe for interchangeable use with the tooling elements of a particular machine tool system. Accordingly, the invention is intended to be limited only by the scope and spirit of the appended claims.

I claim:

1. In a touch probe having a stylus, a housing and an axis common thereto, apparatus for mounting the stylus for movement relative to the housing comprising:

a first member movable relative to the housing and capable of being coupled to the stylus;

a second member fixed relative to the housing;

means defining a line contact on one of the first and second members extending along a direction normal to the common axis;

first and second contact elements protruding from the other one of the first and second members, each contact element abutting in substantially point contact fashion the line contact in a rest position for the first member; and constraining means including at least two axially spaced resilient members each coupled at one of their ends to the movable member and at their opposite ends to the fixed member, each of said resilient members extending generally in the same direction normal to said common axis, said constraining means being operative to prevent all motion of the first member relative to the second member except for linear motion parallel to the common axis and pivotal motion in planes parallel to both the common axis and the line contact.

2. In a touch probe having a stylus, a housing and an axis common thereto, apparatus for mounting the stylus for movement relative to the housing comprising:

a first member movable relative to the housing and capable of being coupled to the stylus;

a second member fixed relative to the housing;

means defining a line contact on one of the first and second members extending along a direction normal to the common axis;

first and second contact elements protruding from the other one of the first and second members, each contact element abutting in substantially point contact fashion the line contact in a rest position for the first member; and constraining means coupled between the first and second members operative to prevent all motion of the first member relative to the second member except for linear motion parallel to the common axis and pivotal motion in planes parallel to both the common axis and the line contact, said constraining means including a substantially planar resilient member coupled between the first and second members in a manner preventing rotation of the first member relative to the second member about any line parallel to the common axis and preventing linear translational movement of the first member relative to the scond member in directios normal to the common axis; and at least one rod element having a longitudinal axis, the rod element being resiliently yieldable except along its longitudinal axis and coupled between the first and second members in a manner preventing pivotal movement of the first member relative to the second member except in planes parallel to both the common axis and the line contact.

3. In a touch probe having a stylus, a housing and an axis common thereto, apparatus for mounting the stylus for movement relative to the housing comprising:

a first member movable relative to the housing and capable of being coupled to the stylus;

a second member fixed relative to the housing;

means defining a line contact on one of the first and second members extending along a direction normal to the common axis;

first and second contact elements protruding from the other one of the first and second members, each contact element abutting in substantially point contact fashion the line contact in a rest position for the first member;

constraining means coupled between the first and second members operative to prevent all motion of the first member relative to the second member except for linear motion parallel to the common axis and pivotal motion in planes prallel to both the common axis and the line contact; and means coupled between the first and second members for adjustably altering pre-load force in the rest position between the first and second contact elements and the line contact.

4. Apparatus as set forth in claim 1 further comprising bias means coupled between the first and second members operative, in cooperation with the constraining means, to urge the first and second contact elements into rest position engagement with the line contact.

5. Apparatus as set forth in claim 2 wherein the means for constraining includes at least two rod elements, each having opposite ends respectively coupled to the first and second members, and each having its longitudinal axis substantially parallel to the plane resilient member and normal to the line contact whenever the first member is in its rest position.

6. In a touch probe having a stylus, a housing and an axis common thereto, apparatus for mounting the stylus for movement relative to the housing comprising:

a first member movable relative to the housing and capable of being coupled to the stylus;

a second member fixed relative to the housing;

means defining a line contact on one of the first and second members extending along a direction normal to the common axis;

first and second contact elements protruding from the other one of the first and second members, each contact element abutting in substantially a point contact fashion the line contact in a rest position for the first member;

constraining means coupled between the first and second members operative to prevent all motion of the first member relative to the second member except for linear motion parallel to the common axis and pivotal motion in planes parallel to both the common axis and the line contact; and wherein the first and second contact elements are spaced equidistant from the common axis in the rest position for the first member.

7. In a touch probe having a stylus, a housing and an axis common thereto, apparatus for mounting the stylus for movement relative to the housing comprising:

a first member movable relative to the housing and capable of being coupled to the stylus;

a second member fixed relative to the housing;

means defining a line contact on one of the first and second members extending along a direction normal to the common axis;

first and second contact elements protruding from the other one of the first and second members, each contact element abutting in substantially point contact fashion the line contact in a rest position for the first member; and constraining means coupled between the first and second members operative to prevent all motion of the first member relative to the second member except for linear motion parallel to the common axis and pivotal motion in planes parallel to both the common axis and the line contact;

means for electrically isolating the line contact from the one of the first and second members;

means for electrically isolating the first and second contact elements from each other whenever the first member is not in its rest position;

a reference potential coupled to one of the first and second contact elements; and an output signal conductor coupled to the other one of the first and second contact elements;

whereby an indicating signal proportional to the reference potential appears on the output signal conductor with a value determined by whether either of the first and second contact elements has begun to move relative to the line contact.

8. A touch probe comprising:

a housing having an aperture in a peripheral surface thereof;

a stylus holder to which a stylus can be coupled, located within and movable relative to the housing and protruding from said aperture along an axis thereof; a linear contact coupled to one of the housing and the stylus holder, extending along a direction normal to the axis of the aperture;

first and second contacts protruding from the other one of the housing and the stylus holder, each contact abutting in substantially point contact fashion the linear contact in a rest position for the stylus holder;

a planar reed spring coupled between the stylus holder and the housing and positioned in a plane substantially normal to the axis of the aperture whenever the stylus holder is in its rest position; and at least one linear wire spring which is substantially non-deformable along its longitudinal axis and otherwise resiliently flexible, the linear wire spring coupled between the stylus holder and the housing at a position spaced from the planar reed spring and with the longitudinal axis of the wire spring parallel to the plane of the reed spring and normal to the direction of extension of the linear contact whenever the stylus holder is in its rest position.

9. The touch probe of claim 8 further comprising at least two linear wire springs, each having opposite ends respectively coupled to the stylus holder and the housing, with the longitudinal axis of each wire spring being parallel to the plane of the reed spring and normal to the direction of extension of the linear contact whenever the stylus holder is in its rest position.

10. The touch probe of claim 8 further comprising a pre-load adjustment screw threadingly engaging a bore passing through a peripheral surface of the housing in a manner such that one end of the pre-load adjustment screw bears against the stylus holder so as to alter the pre-load force in the rest position between the first and second contacts and the linear contact in accordance with a variable position of the pre-load adjustment screw.

11. The touch probe of claim 8 further comprising a coil spring having opposite ends bearing respectively against the stylus holder and the housing along a line normal to the direction of extension of the linear contact and substantially equidistant from the first and second contacts whenever the stylus holder is in its rest position.

12. The touch probe of claim 8 further comprising:
means for electrically isolating the linear contact from the one of the housing and the stylus holder;
means for electrically isolating the first contact from the other one of the housing and the stylus holder;
means for grounding the second contact to the housing; and
an output signal conductor coupled to the first contact, whereby an indicating ground signal appears on the output signal conductor whenever the stylus holder is in the rest position and a signal other than ground appears whenever either of the first and second contacts have begun to move relative to the linear contact.

13. The touch probe of claim 8 wherein the first and second contacts are spaced equidistantly from the axis of the aperture whenever the stylus holder is in its rest position.

14. A touch probe for use with two axis type machine tools, such as lathes and turning centers, the touch probe comprising:
an elongate housing having a housing cavity and an aperture communicating therewith through an end wall of the housing;
a linear contact strip in the cavity rigidly coupled to the end wall;
a support block rigidly coupled to the housing at a first side of the cavity extending normally to the end wall;
a stylus holder movable relative to the housing and having a first portion located in the housing cavity at a second side thereof opposite and parallel to the first side and including first and second substantially spherical contacts protruding from the first portion such that each contact, in a rest position for the stylus holder, makes substantially a point contact with the linear contact strip to define a linear dimension extending normally to an axis of the housing aperture, the stylus holder also having a second portion protruding from the housing through the housing aperture and having means for coupling receipt of a stylus;
a planar reed spring coupled between the support block and the first portion of the stylus holder and extending in a plane normal to the axis of the housing aperture when the stylus holder is in its rest position, operative to prevent rotation of the stylus holder about the axis of the aperture and to prevent translational non-pivoting movement of the stylus holder in directions normal to the axis of the aperture;
first and second linear wire springs, each being substantially non-deformable along its longitudinal axis and otherwise resiliently flexible, and each coupled between the first portion of the stylus holder and the support block at positions spaced from the planar reed spring with its longitudinal axis parallel to the plane of the reed spring and normal to the defined linear dimension, the first and second wire springs operative to permit pivoting movement of the stylus holder only in planes parallel to both the aperture axis and the defined linear dimension; and
electrically coupled to the first and second substantially spherical contacts for indicating movement by either thereof relative to the linear contact strip.

15. The touch probe of claim 14 wherein the first and second substantially spherical contacts are equidistant from the axis of the aperture whenever the stylus holder is in its rest position.

16. The touch probe of claim 14 wherein the planar reed spring is coupled between the first portion of the stylus holder and the support block in a plane closer to the housing aperture than the coupling locations for the first and second wire springs, the planar reed spring including an aperture surrounding the second portion of the stylus holder and in substantially axial alignment with the housing aperture.

17. The touch probe of claim 14 further comprising a coil spring having opposite ends respectively bearing against the first portion of the stylus holder and a wall of the housing cavity facing the end wall, a longitudinal axis of the coil spring extending normal to the defined linear dimension and spaced equidistantly from the first and second substantially spherical contacts whenever the stylus holder is in its rest position.

18. The touch probe of claim 14 further comprising a pre-load adjustment screw engaging the first portion of the stylus holder through a threaded bore in the housing, the screw positioned such that upon axial movement thereof, the first portion of the stylus holder is pivoted in a plane passing through the defined linear dimension to alter the pre-load force in the rest position between the first and second contacts and the linear contact strip.

19. The touch probe of claim 14 further comprising an electrically non-conducting seat securing the first substantially spherical contact to the first portion of the stylus holder such that the first contact is electrically isolated from the first portion of the stylus holder, an electrically conductive seat securing the second substantially spherical contact to the first portion of the stylus holder, and means for electrically isolating the linear contact strip from the end wall of the housing cavity;

and wherein the means for indicating comprises means for electrically grounding the first portion of the stylus holder thereby grounding the second contact via the electrically conductive seat, and an output signal conductor coupled to the first substantially spherical contact.

20. The touch probe of claim 14 wherein the housing is of substantially rectangular shape.

* * * * *